(12) United States Patent
Cohen et al.

(10) Patent No.: US 9,002,830 B2
(45) Date of Patent: Apr. 7, 2015

(54) DETERMINING RELIABILITY OF ELECTRONIC DOCUMENTS ASSOCIATED WITH EVENTS

(75) Inventors: Ira Cohen, Modiin (IL); Gilad Barash, Cambridge, MA (US); Eli Mordechai, Modiin (IL); Carl Staelin, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 859 days.

(21) Appl. No.: 12/834,592

(22) Filed: Jul. 12, 2010

(65) Prior Publication Data

US 2012/0011113 A1 Jan. 12, 2012

(51) Int. Cl.
*G06F 17/30* (2006.01)

(52) U.S. Cl.
CPC .... *G06F 17/30864* (2013.01); *G06F 17/30011* (2013.01)

(58) Field of Classification Search
USPC .......................................................... 707/723
See application file for complete search history.

(56) References Cited

U.S. PATENT DOCUMENTS

| | | | |
|---|---|---|---|
| 2004/0249914 A1* | 12/2004 | Flocken et al. | 709/223 |
| 2008/0027922 A1* | 1/2008 | Togari et al. | 707/4 |
| 2008/0183668 A1* | 7/2008 | Bhamidipaty et al. | 707/2 |
| 2008/0263404 A1* | 10/2008 | Vidiyala | 714/38 |
| 2009/0182729 A1* | 7/2009 | Lu et al. | 707/5 |
| 2009/0240680 A1* | 9/2009 | Tankovich et al. | 707/5 |
| 2010/0057677 A1* | 3/2010 | Rapp et al. | 707/3 |
| 2010/0070486 A1* | 3/2010 | Punaganti Venkata et al. | 707/722 |
| 2011/0113048 A1* | 5/2011 | Njemanze | 707/755 |
| 2012/0233181 A1* | 9/2012 | Shehata et al. | 707/748 |

\* cited by examiner

*Primary Examiner* — Rehana Perveen
*Assistant Examiner* — Alexander Khong
(74) *Attorney, Agent, or Firm* — Van Cott, Bagley, Cornwall & McCarthy

(57) ABSTRACT

A method of determining reliability of electronic documents associated with an event occurring in connection with a computing device may comprise, with a processor, composing a number of search queries based on text included in an event message, searching for a number of electronic documents via a network, said searching performed based on the composed search queries, and ranking the electronic documents identified by said searching based upon an indication of reliability in addressing the event associated with the event message, in which, ranking the electronic documents comprises applying a content source ranking criteria.

18 Claims, 4 Drawing Sheets

DETERMINING RELIABILITY OF ELECTRONIC DOCUMENTS ASSOCIATED WITH EVENTS

BACKGROUND

As computing devices and systems, and their associated software and middleware component grow in complexity, the generation of events within the computing devices and systems proportionally increase. Events may be described as an occurrence of significance within a computing device or system, and may include completion or failure of an operation, or the change in state of a process within a computing device or system. Thus, events may reflect normal behavior as well as abnormal behavior (errors and outages) within computing devices and systems.

Events are used to alert a user of the current status of the computing devices or systems, and to help troubleshoot problems that may affect performance of the computing devices and systems. These events are often manifested by hardware and software in text form as messages provided to a user.

It is apparent that errors encountered while operating the computing devices or systems are also prevalent in view of the growth in computing technology. This situation is compounded by the fact that these computing devices and systems are continually inundated by viruses, malware, spyware, and other foreign files that slow or halt the computing device's ability to perform processes or otherwise function in an intended manner.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
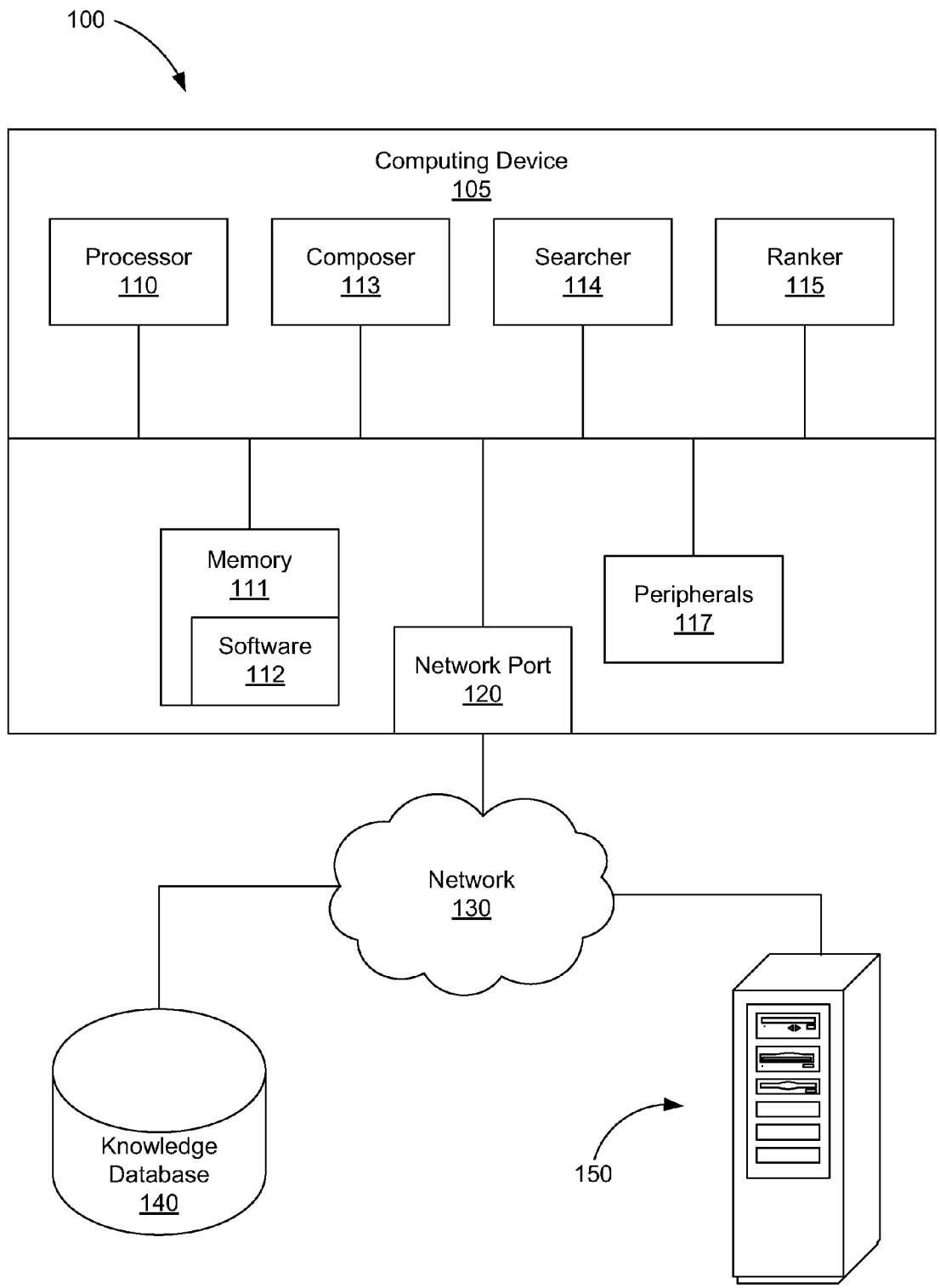
FIG. 1 is a diagram of an illustrative system for associating electronic documents with events, according to one embodiment of principles described herein.

The various embodiments of the principles described herein provide for a system that automatically collects, ranks, and associates electronic documents describing events, the issues and problems these events represent, and procedures to resolve the events from the various electronic document sources. The various embodiments of the principles described herein may be provided over any kind of network, including an intranet and the Internet. A knowledge database may be compiled based on the ranking and association of electronic documents and events to help users resolve issues faster.

In the following description, for purposes of explanation, numerous specific details are set forth in order to provide a thorough understanding of the present systems and methods.

It will be apparent, however, to one skilled in the art that the present apparatus, systems, and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

As used in the present specification and the appended claims, the term "event" is meant to be understood broadly as any occurrence of significance within a computing device, computing system or associated peripherals, software, firmware, and middleware. Events may include completion or failure of an operation, or the change in state of a process within a computing device or system. Thus, events may reflect normal behavior as well as abnormal behavior (errors and outages) within a computing devices and related systems.

As used in the present specification and the appended claims, the term "electronic document" is meant to be understood broadly as any machine-readable collection of data or one or more objects that represent human-readable information. A electronic document may include, for example, a word processing document, an ADOBE® portable document file (PDF), a product manual, a discussion string presented on an online forum, a technology support page, a hypertext document, and combinations thereof, among others. These electronic documents may be located at various sources, for example, online forums, blogs, chat rooms, social networks, wikis, an intranet, an internet, the Internet, a memory device, and a knowledge database, among others.

When errors occur in computing devices and systems, the hardware and associated software often display the above-described message to a user that a particular error has occurred. Often, these messages are specific to the type of error encountered. In order to alleviate the encountered error, the user may be inclined to search for a solution to the error. Several potential sources for a solution to the errors encountered exist.

The computing devices and systems and their associated software and peripherals may be sold with product manuals or offer these manuals via the Internet. These product manuals may prove to be helpful in resolving these errors. Further, some major computer manufacturers and software developers provide resources on their respective Internet websites to resolve errors encountered while operating the computing devices and systems. For example, such Internet websites may include MICROSOFT's® online support page found at http://support.microsoft.com, MICROSOFT's® Developer Network found at http://msdn.microsoft.com/en-us/default.aspx, and HEWLETT-PACKARD's® Support and Troubleshooting webpage found at http://welcome.hp.com/country/us/en/support_task.html?pageDisplay=support.

Other sources for solutions to errors encountered in connection with computing devices and systems may include secondary resources. These secondary resources may include the results of discussions or other communications posted on online forums, blogs, chat rooms, social networks, among others. However, it is often time consuming to search for solutions to errors encountered during operation of the computing devices and systems. Further, often times, a user may find a relevant source that discusses the error, but fails to provide a solution. This situation is often encountered when a user searches the above-described secondary resources.

The above resources are located in various decentralized electronic document corpora, and are, therefore, difficult to navigate to and access. Further, when a electronic document is found that may be pertinent to a resolution of the event, a user may find that ultimately, the electronic document was misleading in its resolution, unclear, or did not provide a resolution at all even though it had mentioned the issue surrounding the event.

Turning now to FIG. 1, a diagram of an illustrative system (100) for associating electronic documents with events, according to one embodiment of principles described herein, is depicted. The system (100) may include a computing device (105), a knowledge database (140), and a number of servers (150). A network (130) may be provided so that each of the computing device (105), knowledge database (140), and server (150) may electronically communicate. The computing device (105) may be, for example, any programmable electronic device that receives, stores, and processes data, and outputs the processed data. Thus, the computing device (105) may be a personal computer, a laptop computer, a desktop computer, a personal digital assistant (PDA), a cellular phone including a smart phone, and a server, among others.

The computing device (105) may include a processor (110) for processing instructions of a computer program or other forms of software, and memory (111). The memory (111) may be any volatile or non-volatile memory device including, for example, an electronic, magnetic, optical, electromagnetic, infrared, or semiconductor data storage device, a computer diskette, a hard disk, a random access memory (RAM), a read-only memory (ROM), an erasable programmable read-only memory (EPROM or Flash memory), an optical fiber, and a portable compact disc read-only memory (CD-ROM), among others.

The memory (111) stores software (112) that may be any combination of computer code executable or otherwise processable by the processor (110). The software (112) may include, for example, system software, application software, programming software, middleware, and firmware, among others.

The computing device (105) may also include a number of peripherals (117). The peripherals (117) may be attached to the computing device (105) in order to provide a user of the computing device (105) a greater range of input and output devices. The peripherals (117) may include, for example, a keyboard, a mouse, a display device, a printer, an image scanner, and a webcam, among others. As stated above, events may occur not only within the computing device (105) per se, but also in connection with the peripherals (117) as well. In this manner, the principles described herein may relate to events encountered during the use of the peripherals (117) as well.

The computing device (105) may also include a network port (120) that electronically connects the computing device (105) with other devices and systems via a network (130). The network port (130) may be any type of hardware, software, or any combination of hardware and software that provides for the transmission of data to and from a device located on a network to the computing device (105).

The computing device (105) may also include a composer (113), a searcher (114), and a ranker (115). These elements work assist in providing association events that occur on the computing device (105) with electronic documents or other sources of information used to address the events. The composer (113), searcher (114), and ranker (115) may exist within the computing device (105) as hardware, software, or any combination of hardware and software. The function and role of the composer (113), searcher (114), and ranker (115) in associating events with electronic documents will be discussed in more detail below.

The system (100) also includes a network (130). The network may be any intranet or internet used to provide communication between two or more computing devices. For example, the network (130) may be a wide area network, a local area network, a wireless network, a virtual private network, and the Internet, among others. In one exemplary embodiment, the network (130) is the Internet where access to a vast array of private, public, academic, business, and government networks ranging from local to global scale provides a user with an almost unlimited amount of information resources and services, including the hypertext documents of the World Wide Web (WWW).

The network (130) provides the computing device (105) with communication to any number of servers (150) and a knowledge database (140). The servers (150) may be any number of computing devices located on the network (130), and from which the computing device (105) may obtain information, including electronic documents relating to events, as will be described in more detail below. The knowledge database (140), like the memory (111) of the computing device (105), may be any volatile or non-volatile memory device including, for example, an electronic, magnetic, optical, electromagnetic, infrared, or semiconductor data storage device, a computer diskette, a hard disk, a random access memory (RAM), a read-only memory (ROM), an erasable programmable read-only memory (EPROM or Flash memory), an optical fiber, and a portable compact disc read-only memory (CD-ROM), among others. The knowledge database (140) stores ranked results of electronic documents that have been associated with events, as will be discussed in more detail below. The knowledge database (140) may exist as a standalone device on the network (130), as a device within a server (150), or as a part of the computing device (105).

Figure 2:
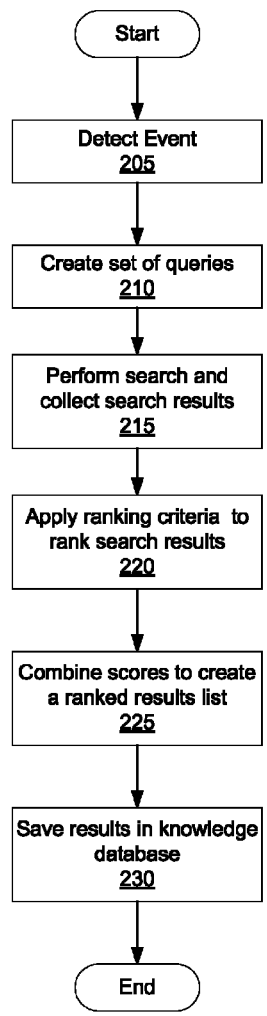
FIG. 2 is a flowchart showing an illustrative method for associating electronic documents with events using a computing device, a network, a server, and a knowledge database, according to one embodiment of principles described herein.

Turning now to FIG. 2, a flowchart showing an illustrative method for associating electronic documents with events using the computing device (105), the network (130), the servers (150), and the knowledge database (140), according to one embodiment of principles described herein, is depicted. The method depicted in FIG. 2 begins with the manifestation and detection of an event (Step 205). The events are text messages displayed by the computing device (105) when any occurrence of significance within a computing device, computing system or associated peripherals, software, firmware, and middleware takes place. Events may include completion or failure of an operation, or the change in state of a process within a computing device or system, and, thus, may reflect normal behavior as well as abnormal behavior (errors and outages) within a computing devices and systems.

Once the computing device (105) detects the occurrence of an event, the composer (113) of the computing device (105) takes as input, the text of the event (or, in the case of several events, the group of events), and creates a set of search queries (Step 210) for the searcher (114) to search. In one exemplary embodiment, the set of search queries may be ranked, and may range from queries that are constrained to include all words in the text of the event in sequence as they appear in the event message to any number of words within the event message in any order. Thus, the constraints are reduced in subsequent queries. Removal of constraints within the search queries may include, for example, allowing flexibility in word ordering, removal of words that contain numbers or special characters, substitution of words for other words with similar meanings (synonym stemming), substitution of a word with that words root terms (word stemming), and removal of words from the queries, among others.

For example, a common event message encountered in computing systems states, "Windows could not start because the following file is missing or corrupt: <Windows root>\system32\hal.dll. Please re-install a copy of the above file." The underlying error related to this event message occurs if, for example, the Default value in the [Boot Loader] section of the Boot.ini file is missing or invalid or the operating system (e.g. WINDOWS® XP®) is not installed in the location specified in the Boot.ini file. However, it will be appreciated that this error message, although common, is simply an example. Any computer error and its associated event message may be applied in the embodiments of principles described herein.

Once the computing device receives the event message, "Windows could not start because the following file is missing or corrupt: <Windows root>\system32\hal.dll. Please re-install a copy of the above file," the composer (113) composes a number of search queries. The first search query may be constrained to include all words in the text of the event in sequence as they appear in the event message as discussed above. Thus, the first search query will state, "Windows could not start because the following file is missing or corrupt: <Windows root>\system32\hal.dll. Please re-install a copy of the above file." Subsequent search queries may include the following:
1. "Windows could not start because the following file is missing or corrupt: <Windows root>\system32\hal.dll. Please re-install a copy of the above file"
2. Windows could not start because the following file is missing or corrupt: <Windows root>\system32\hal.dll. Please re-install a copy of the above file
3. Windows could not start because the following file is missing or corrupt: Please re-install a copy of the above file
4. Windows could not start because following file is missing lost: Please re-install copy of above file
5. Windows could not start because follow file is miss lost: Please re-install copy of above file
6. could not start follow file is miss lost re-install copy of file Windows The above subsequent search queries are only examples of an original search query that has been subjected to a reduction in constraints. An almost unlimited number of subsequent search queries may be composed in order to better facilitate the searching of queries relating to the original event message.

Next, the searcher (114) performs and collects the search results (Step 215). In one exemplary embodiment, the searcher (114) goes through the set of queries composed by the composer (113), and, starting from the most restrictive (the first query), passes it to a number of search engines. The search engines may be any program that accepts a search request and returns a list of electronic documents to the user relevant to the search request. In one exemplary embodiment, the search engine is the GOOGLE® search engine utilizing the GOOGLE® search engine application programming interface (API). However, other search engines may include, for example, the BING® search engine, the ASK.COM® search engine, and the YAHOO! SEARCH® search engine, among others.

In addition to a search performed over the Internet (e.g., a search for technical websites, user forums, etc.), in another exemplary embodiment, the search engine may comprise a search performed over any type of network, including a private network. Thus, searcher (114) may search an intranet for internal knowledge articles, MICROSOFT® SHAREPOINTS® documents, wikis, and online product documentation, among others, to find data that pertains to the events. In yet another exemplary embodiment, the searcher (114) may perform a search within a memory device, including the memory (111) of the computing device (105) or the knowledge database (140). In still another exemplary embodiment, the searcher (114) may perform a search within a combination of the above sources.

The searcher (114) collects the search results from each query. In one exemplary embodiment, the searcher (114) collects the results of each search in their preliminary ranked order. For example, if the searcher (114) used the GOOGLE® search engine, then the results would be preliminarily ranked by the searcher (114) based on the ranking provided by the GOOGLE® search engine. The searcher (114) may stop searching when a predetermined amount of results are returned (e.g., 20 electronic documents). This predetermined amount of results may be user definable, defaulted, or defined by the computing device (105).

Next, the ranker (115) applies ranking criteria to the search results provided by the searcher (114) (Step 220). More specifically, the ranker (115) goes over the set of search results, computes rank scores based on a number of criteria, and combines the different rank scores using weighting of importance. In one exemplary embodiment, the ranker (115) computes rank scores based on a quality of information (QOI) ranking criteria. In another exemplary embodiment, the ranker (115) computes rank scores based on a content source ranking criteria. In yet another exemplary embodiment, the ranker (115) computes rank scores based on a content relevancy ranking criteria. Finally, in yet another exemplary embodiment, the ranker (115) computes rank scores based on a combination of these ranking criteria. Each of these ranking criteria will now be discussed in more detail.

Figure 3:
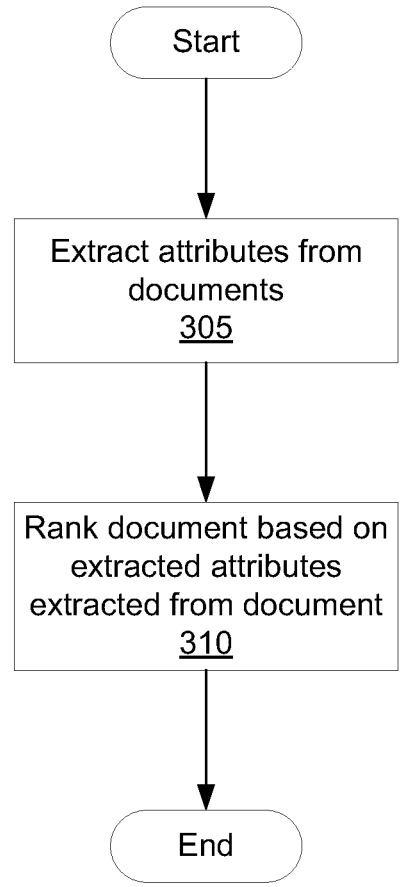
FIG. 3 is a flowchart showing an illustrative ranking method using quality of information (QOI) ranking criteria, according to one embodiment of principles described herein.

First, the quality of information (QOI) ranking criteria ranks electronic documents based on the quality of information of the electronic document. FIG. 3 is a flowchart showing an illustrative ranking method using quality of information (QOI) ranking criteria, according to one embodiment of principles described herein. QOI ranking measures how fit certain data is for use by quantifying whether the correct information is being used to make a decision or to take a certain action. The method described in FIG. 3 begins by extracting attributes of the various electronic documents included in the search results performed by the searcher (114) (FIG. 2, Step 215; FIG. 3, Step 305). The electronic document attributes may include attributes that are innate to the data source and are context-free such as the date of creation of the electronic document and completeness of the electronic document. The electronic document attributes may also include attributes that are content-specific, which must be extracted from the unstructured text data within the data source. It is the latter type of attributes that pose the biggest research challenge due to their elusive and unstructured nature.

The extraction of attributes from the electronic documents may be performed by the processor (110) executing an application program capable of searching for and finding attributes in the electronic documents. The application program may include, for example, a data scraping application capable of extracting data from human-readable output. The data scraping application may include screen scraping, web scraping, web crawling, and report mining applications.

In order to find the QOI of, for example, user forum threads, both the above-described innate and content-specific attributes may be extracted. The attributes may include, for example, the following list, among others:

1. Whether the thread is marked as "Answered" or "Not Answered."
2. The date the thread was last modified.
3. The number of replies to the original poster (OP).
4. The total number of replies in the thread.
5. The total number of words in the thread.
6. The thread duration (e.g., in days).
7. The highest rank of any poster in the thread.
8. Whether the last post was written by the original poster.
9. Whether the last post includes a derivation of the words "thank you."
10. Whether the last post includes a question mark.
11. Whether the last post was written by the original poster and includes a derivation of the words "thank you."
12. Whether the last post was written by the original poster and contains a question mark.
13. Whether the last post was written by the original poster and contains derivations of the words "thank you," and a question mark.
14. The number of links contained in the thread.

In one exemplary embodiment, "answered" threads may be ranked higher due to their high utility. Some online forums provide for a user of poster to mark the thread as "answered" or "not answered." However, many online forums do not provide this option. In one exemplary embodiment, it is possible to determine whether a thread was answered or not based on the other attributes extracted from the thread. For example, it may be determined that the thread was answered if the last post in the forum included the phrase "thank you," or a derivation thereof. Other attributes listed above may be used in a similar fashion to determine if the thread was answered.

Thus, whether a forum thread was answered or not may be inferred from the attributes extracted from the electronic document. In one exemplary embodiment, the above exemplary list of attributes may be ranked and weighted in order to give the most important attributes a higher weight. In another exemplary embodiment, the function mapping between the attributes and whether the thread was answered or not is learned using labeled examples (examples that provide for labeling of the thread as "answered" or "not answered"). Classifiers may be learning classifiers that infer attributes that are not available in all threads of an online forum (e.g., answered/not answered). Classifiers may be produced that may be used to label any new thread using the extracted attributes and the learned function. In some forums, the labels (answered/not answered) may simply be extracted. In those online forums that do not provide for labeling a thread as answered or not answered, the label may be inferred using the classifiers that are learned.

Some electronic documents such as online forums do have labels provided by the users or posters of the forum as to whether a thread is answered or not. Other online forums do to provide this functionality. Learning classifiers based on examples from online forums that do provide the functionality of providing answers may be used on any other online forum that does not provide the users or posters with the ability to mark their questions as answered. In this way, since the labels are available, no human intensive labor is required in classifying those online forum threads that are not labeled as answered or not answered.

Example 1

The learning result from one internet domain's online forum may be applied to other domains' online forums. To test the ability to classify forum threads, for example, as "answered" or "not answered," threads from two different public forums were gathered: an ORACLE® online forums (5500 threads), and an IBM® online forum (1200 threads), extracting 10 quality related attributes. These sites were chosen because they provide a label to each thread on whether the original poster's question was answered or not. Decision tree classifiers on the threads from the different sites were trained. The classifiers on the threads from the same site (using cross validation) and from the different site were tested. The results are shown in Table 1 below.

TABLE 1

Classification accuracy on IBM/Oracle forums

| Train | Test | |
|---|---|---|
| | Oracle | IBM |
| Oracle | 90% | 85% |
| IBM | 79% | 97% |

Table 1 demonstrates that while the accuracy is reduced when transferring a classifier from one forum to another, it remains high, validating the generalization of the classifiers. Further, it has been determined that the utility supported scraping HEWLETT-PACKARD® (HP®) online forums, as well as those of IBM® and ORACLE®.

As discussed above, in some online forums, whether an original poster's question in the thread was "answered" or "not answered" may be marked by the original poster. However, even in online forums where this is possible, many threads can be inaccurately designated, leading to a problem of "noisy" results in determining QOI. This is caused by the fact that marking a thread as "answered" is a manual operation that must be performed by the original poster when and if his question is answered. Often, an original poster will find their question answered in the thread, but neglect to indicate (e.g. via checking a box) the thread as "answered." Therefore, while threads that were designated as "answered" tend to always, in practice, have the answers in them, those that were left as "unanswered" may, at times, include the answers to the original poster's question. This may create "label noise" within a search for reliable electronic documents. Thus, the examples gleaned from online forums that do have the labels must be handled carefully and not trusted completely.

In order to alleviate the issue of label noise, an ensemble-classifier training algorithm may be utilized to help identify and remove misclassified labels. The below ensemble-classifier training algorithm may utilize a concept of majority vote wherein different classifiers vote on whether or not the training sample is correctly labeled. The votes are tallied accordingly. This alleviates possibilities of over-fitting by one or more classifiers. The algorithm is described as follows:

Algorithm 1: Ensemble classification method for handling noisy labels:

For every sample
  For every classifier
    Classify sample with classifier
    If given label equals classified labels, return 1
    Else return −1
  Aggregate results of all classifiers for each sample
  If result > 0 (i.e. majority of classifiers classified sample correctly),
    add sample to new training data
  If result < 0 (i.e. majority of classifiers misclassified sample),
    discard training sample.
Train all classifiers with new training data The above algorithm may be extended and improved by changing the step that discards training samples. If a majority of classifiers misclassified the sample, there is a good chance that if its label is flipped, it would then be correctly classified. Rather than discarding training samples that were voted as having been misclassified, their labels may be flipped and added back into the new training set, thus boosting correct classification without throwing out any samples.

Next, the processor (110) ranks the electronic documents based on the extracted attributes extracted from electronic documents (Step 310). For the purposes of ranking user forum threads, or other electronic documents, one of the main QOI attributes may be whether a thread was considered as having been answered, since these would be the results subsequent posters would find most helpful in resolving their experienced event. Thus, in one exemplary embodiment, the processor (110) may be configured to assign classifiers to the electronic documents that denote whether the question was actually answered, and thus should be ranked higher as a useful electronic document.

Example 2

The above revised algorithm was tested on datasets with a varying amount of artificially placed "noisy labels" in order to determine how robustly the revised algorithm performs. For each dataset, between 10% and 40% of the labels were randomly flipped so that they became noisy prior to classifier training. The classification accuracy results of running both methods for each of five noise levels appear in Table 2 below:

TABLE 2

Classification accuracy results

| Method | % Noise | | | | |
|---|---|---|---|---|---|
| | 0% | 10% | 20% | 30% | 40% |
| No noise filter | 0.7794 | 0.7527 | 0.7341 | 0.6877 | 0.6464 |
| Ensemble filter | 0.7813 | 0.7681 | 0.7488 | 0.7237 | 0.6912 |
| Ensemble flip filter | 0.7805 | 0.7680 | 0.7499 | 0.7258 | 0.6940 |
| No noise | 0.7794 | 0.7794 | 0.7794 | 0.7794 | 0.7794 |

Based on the results, the following observations may be noted: (1) the ensemble method is robust to different noise percentages; (2) flipping the noisy labels improves the classification ability; (3) multiple flip iterations do not improve results; (4) less restrictive classifiers (nearest neighbor/decision trees) were more sensitive to label noise; and (5) false negatives (left-over noisy samples) have more detrimental effect compared to false positives (non-noisy samples with low weights).

In one exemplary embodiment, a modified version of the ensemble-classifier training algorithm with weighted samples may be provided to iteratively reduce mislabeled samples' weights. This embodiment has demonstrated better performance with higher levels of noise in the data. However, this exemplary embodiment was less robust to low level of noise. Given that the level of noisy labels in the data is unknown, it may be more effective to utilize the ensemble-classifier training algorithm with the flipping mechanism in the present system.

Figure 4:
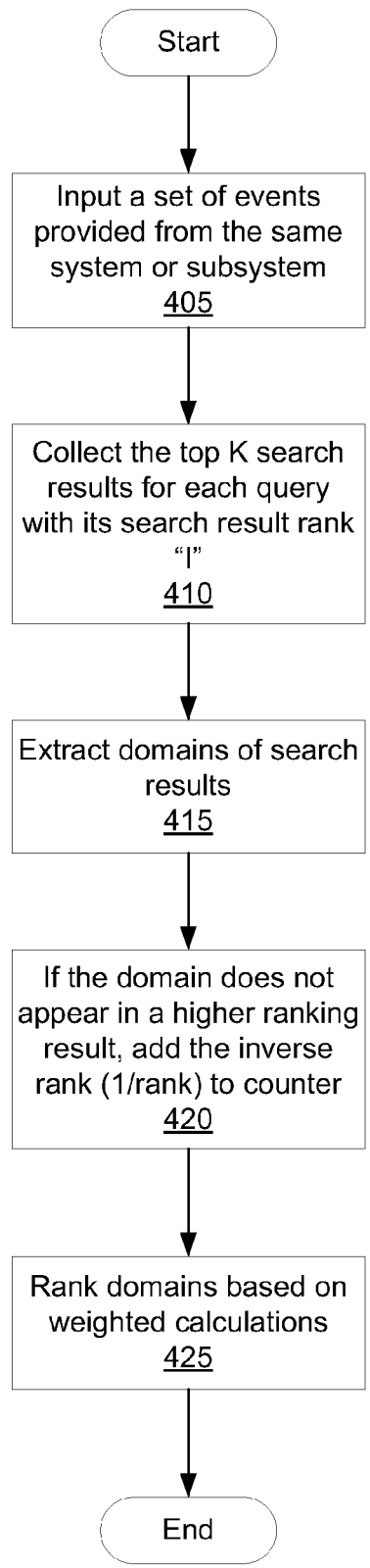
FIG. 4 is a flowchart showing an illustrative ranking method using content source ranking criteria, according to one embodiment of principles described herein.

The ranker (115) may also apply ranking criteria to the search results provided by the searcher (114) (Step 220) by computing rank scores based on a content source ranking criteria, as discussed above. FIG. 4 is a flowchart showing an illustrative ranking method using content source ranking criteria, according to one embodiment of principles described herein. In addition to leveraging information regarding the source of the event within the computing device (105), many types of events may be queried for each system or subsystem of the computing device (105) to rank different sources of electronic documents, such as forum domains, internal knowledge databases, and any general internet domain. In this manner, many search queries may be performed based on a large set of events from the same system or subsystem source (e.g., ORACLE® database). When searching the internet and intranet, among other sources, there are many sources of electronic documents (e.g., HP®, IBM®, and ORACLE® technology forums) that may be more or less relevant to the types of events encountered in a given system or device (e.g., the computing device (FIG. 1, 105)). For example, an IBM® forum site may be less relevant compared the ORACLE® technology forum site if the events come from a system running an ORACLE® database or other ORACLE® product. In this manner, the sources of electronic documents may be ranked in a weighted manner based on the type of events being queried.

The source of the events is sometimes known (e.g., APACHE® software, ORACLE® database, SUN MICROSYSTEMS® JAVA server platform, MICROSOFT® WINDOWS® operating system, etc). Further, it may also be known that a group of events came from the same type of system or subsystem of the computing device (105). In one exemplary embodiment, the processor (110) provides, as input, a set of events provided from the same system or subsystem (Step 405). The steps of creating a set of search queries (FIG. 2, Step 210), and performing and collecting the search results (FIG. 2, Step 215) may then be performed for each event being analyzed as described in FIG. 2. Next, a number of the top search results (K search results) for each query may be collected, and each results' rank ("i") may be determined (Step 410). In one exemplary embodiment, K may be, for example, the top fifty (50) search results. However, any number of search results may be included. Further, the number of the top search results (K) may be user definable, may be a default number, or a combination of these.

Next, the processor (110) extracts the domain name for each search result (Step 415). All of the results may be collected, and, in the case of internet search, the origin domain may be extracted from the various sources (Step 415). Next, it is determined that if the origin domain does not appear in a higher ranking result, the inverse of the rank (1/i), in one exemplary embodiment, is added to previous counts (Step 420). Generally, any monotonically decreasing function may be used to rank each domain in the search result. For example, in addition to the inverse of the rank as described above, exponential or log functions may also be used in ranking each domain in the search result.

Finally, each domain may then be ranked based on the above weighting calculations to produce a weighted list of domains from most appearances to least appearances (Step 425). Thus, list of domains that reflects a weighted sum of a number of appearances throughout multiple searches may be achieved. Content source ranking may work as demonstrated in Algorithm 2, as follows:

---

Algorithm 2: Content Source Ranking

Input: Set of events E from the same subsystem source (e.g., Oracle DB events)
Initialize DomainHash as Hashtable of domain names
For each event in E do the following:

-continued

Algorithm 2: Content Source Ranking

```
Run the composer to create a set of queries
Run the searcher on each query
Collect the top K search results for each query with its search
result rank i
For each search result in their ranked order (i=1,...,K)
    CurrentDomain ← Domain name from the full URL (e.g.,
    hp.com)
    If the CurrentDomain did not appear in a higher rank
    \\ Add the inverse rank of the domain in the current search
    to previous counts
        Domain Hash(CurrentDomain) += 1/i;
Extract RankedList with weight of domains from DomainHash
```

To demonstrate the results of the content source ranking, tests were ran on two types of logs. The first log was a WINDOWS® log containing mainly multiple printer events. The second log was a combination of log events from multiple components of HP® software's Business Availability Center (BAC) software, including HP® events, JAVA® events, JBOSS® events, APACHE® events, database events, etc.). The top eight results, with their rank are shown in Table 3 below.

TABLE 3

Source ranking results

| | Printer log events source ranking | | BAC log events source ranking | |
|---|---|---|---|---|
| 1. | hp.com | 119.157375 | hp.com | 59.369148 |
| 2. | ibm.com | 65.521497 | microsoft.com | 51.931098 |
| 3. | microsoft.com | 43.811642 | eggheadcafe.com | 36.795678 |
| 4. | oracle.com | 42.549713 | experts-exchange.com | 33.695516 |
| 5. | apache.org | 36.819445 | forums.techarena.in | 25.293438 |
| 6. | sun.com | 28.664713 | pcreview.co.uk | 14.205668 |
| 7. | scribd.com | 25.912615 | tech-archive.net | 14.055154 |
| 8. | jboss.org | 25.084923 | soft32.com | 13.247566 |

As demonstrated in Table 3, above, "hp.com" ranks at the top in both cases, with enterprise related sites ranked high in the case of BAC logs, and consumer related technology help sites in the case of the printer logs. The scores within the ranking are shown. The scores indicate that there is a quick drop in rank between the first rank and the eighth rank.

The system (100), and, particularly, the processor (110) of the computing device (105) may then perform a content relevancy ranking in which the relevancy of each electronic document to the events that were part of the query are computed (FIG. 2, Step 220). The relevancy computation includes the edit distance between the events and the electronic document by determining how much of the event text actually appeared in the electronic document, where in the electronic document the searched text appeared, and by whom the text was provided by (e.g., if it is a forum, was it written by the user with the problem?). Additional attributes making up relevance are determined by the creation date of the electronic document, determining whether it is still relevant to the version of the system, subsystem, and/or software which created the event (e.g., events from an ORACLE® 8 may be less relevant to an event generated by a system with ORACLE® 10).

In one exemplary embodiment, the relevancy may be determined by calculating the Levenshtein distance between the text of the event message and the text of the electronic document found in the search. The Levenshtein distance is a metric for measuring the amount of difference between two sequences (i.e. the event text and the text in the electronic document). The Levenshtein distance may be expressed in code as follows:

```
int LevenshteinDistance(char s[1..m], char t[1..n])
{
    // d is a table with m+1 rows and n+1 columns
    declare int d[0..m, 0..n]
    for i from 0 to m
        d[i, 0] := i // deletion
    for j from 0 to n
        d[0, j] := j // insertion
    for j from 1 to n
    {
        for i from 1 to m
        {
            if s[i] = t[j] then
                d[i, j] := d[i−1, j−1]
            else
                d[i, j] := minimum
                (
                    d[i−1, j] + 1,     // deletion
                    d[i, j−1] + 1,     // insertion
                    d[i−1, j−1] + 1    // substitution
                )
        }
    }
    return d[m,n]
}
```

Finally, the scores attributed from one or more of the above described quality of information (QOI) ranking criteria, content source ranking criteria, and content relevancy ranking criteria may be combined to create a master ranked results list (FIG. 2, 225). The results of the various ranking methods may be combined in three steps. First, the search engine returns a ranked list of results. In one exemplary embodiment, the initial implementation may use the GOOGLE® search API, and therefore the ranking is based on the GOOGLE® search engine. Second, for each search result, the domain may be extracted, and the GOOGLE® rank of the electronic document with the source ranking position (weighted by the source rank weight) may be averaged. This produces a new ordering of the search results. Lastly, when the results are forum threads, the order of the results may be changed based on the quality of information measures giving highest weight to whether there is an answer or not, and lower weights to the other quality measures, as described above. The ranked results, together with all of the separate ranking measures may then be stored in the knowledge database (140) (FIG. 2, Step 230). This gives the flexibility to re-rank the order based on inputs from users on the quality of the search results, giving higher or lower weights to the various ranking measures.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:
1. A method of determining reliability of electronic documents associated with an event occurring in connection with a computing device, comprising, with a processor:
    with a composer module executed by the processor:
        obtaining text within an event message, the event message being generated as a result of change in state of a process within the computing device;

composing a number of search queries using the text within the event message as input in the search queries;

searching for a number of electronic documents via a network, said searching performed based on the composed search queries; and ranking the electronic documents identified by said searching based upon an indication of reliability in addressing the event associated with the event message, in which ranking the electronic documents comprises applying a content source ranking criteria, in which applying a content source ranking criteria to the electronic documents identified by the searching comprises:

collecting a number of top search results; and extracting a number of domains from a number of electronic documents within the search results.

2. The method of claim 1, in which composing a number of search queries using text within an event message is performed automatically by the processor when an event message is received at the computing device.

3. The method of claim 1, further comprising adding the result of a monotonically decreasing function to a count if the domain does not appear in a higher ranking search result.

4. The method of claim 3, further comprising ranking each electronic document based on the result of the monotonically decreasing function added to the count.

5. The method of claim 3, in which the monotonically decreasing function is at least one of an inverse of the search rank, an exponential function, and a logarithmic function.

6. The method of claim 1, further comprising storing an association of events with the ranked results in a knowledge database.

7. A method of determining reliability of electronic documents associated with an event occurring in connection with a computing device, comprising, with a processor:

composing a number of search queries based on text included in an event message, the event message being generated as a result of an occurrence within the computing device;

searching for a number of electronic documents via a network, said searching performed based on the composed search queries; and ranking the electronic documents within results of the search based upon the reliability in addressing the event associated with the event message, in which ranking the electronic documents within results of the search comprises applying a quality of information (QOI) ranking criteria to the electronic documents within results of the search, in which applying a quality of information (QOI) ranking criteria to the electronic documents within results of the search comprises:

extracting a number of attributes from the electronic documents within the results of the search; and ranking the electronic documents based on the extracted attributes.

8. The method of claim 7, in which composing a number of search queries based on text included in an event message is performed automatically by the processor when an event message is received at the computing device.

9. The method of claim 7, further comprising ranking the electronic documents by applying a content source ranking criteria.

10. The method of claim 7, in which the network is at least one of an intranet, an internet, a wide area network, a local area network, a wireless network, a virtual private network, and the Internet.

11. The method of claim 7, in which the extracted attributes designate whether questions within the electronic documents were answered or not answered.

12. The method of claim 11, in which the extracted attributes designating whether questions within the electronic documents were answered or not answered function as classifiers in classifying electronic documents that do not allow for designating whether the electronic document was answered or not answered, as either answered or not answered.

13. The method of claim 7, in which the extracted attributes are at least one of whether the electronic document is marked as "Answered" or "Not Answered"; the date the electronic document was last modified; the number of replies in the electronic document to an original poster; the total number of replies in the electronic document; the total number of words in the electronic document; the electronic document duration; the highest rank of any poster in the electronic document; whether the last of a number of posts was written by the original poster; whether the last post includes a derivation of the words "thank you"; whether the last post includes a question mark; whether the last post was written by the original poster and includes a derivation of the words "thank you"; whether the last post was written by the original poster and contains a question mark; whether the last post was written by the original poster, contains a derivation of the words "thank you", and a question mark; and the number of links contained in the electronic document.

14. The method of claim 7, further comprising storing an association of events with the ranked results in a knowledge database.

15. A system for associating events occurring in connection with a computing device with electronic documents, comprising:

a processor to instruct:

a composer to compose a number of search queries based on text included in an event message, the event message being generated as a result of change in state of a process within the computing device; and a ranker to rank electronic documents within results of a search performed based on the composed search queries, in which the ranker ranks the electronic documents within the results of the search based on a quality of information (QOI) ranking criteria, in which ranking the electronic documents based on the QOI ranking criteria comprises extracting a number of attributes from the electronic documents within the results of the search, in which the extracted attributes designate whether questions within the electronic documents were answered or not answered.

16. The system of claim 15, in which ranking the electronic documents within results of the search based on a quality of information (QOI) ranking criteria comprises:

extracting a number of attributes from the electronic documents within the results of the search; and ranking the electronic documents based on the extracted attributes.

17. The system of claim 15, in which the ranker ranks the electronic documents within results of the search by applying a content source ranking criteria to the electronic documents within results of the search, in which applying a content source ranking criteria to the electronic documents within results of the search comprises:
  collecting a number of top search results;
  extracting a number of domains from a number of electronic documents within the results;
  adding the result of a monotonically decreasing function to a count if the domain does not appear in a higher ranking result; and
  ranking each electronic document based on the result of the monotonically decreasing function added to the count.

18. The system of claim 15, further comprising a knowledge database electrically coupled to the computing device for storing data relating to the association of events with the ranked electronic documents.

* * * * *